United States Patent [19]

Stanley et al.

[11] Patent Number: 5,444,374
[45] Date of Patent: Aug. 22, 1995

[54] METHOD AND APPARATUS FOR SIMULTANEOUSLY COLLECTING SPATIALLY AND TEMPORALLY VARYING MAGNETIC SURVEY DATA

[75] Inventors: John Stanley; Malcolm K. Cattach; Stephen J. Lee, all of Armidale, Australia

[73] Assignee: University of New England, Armidale, Australia

[21] Appl. No.: 955,875

[22] PCT Filed: Jun. 3, 1991

[86] PCT No.: PCT/AU91/00238
§ 371 Date: Feb. 5, 1993
§ 102(e) Date: Feb. 5, 1993

[87] PCT Pub. No.: WO91/19210
PCT Pub. Date: Dec. 12, 1991

[30] Foreign Application Priority Data

Jun. 6, 1990 [AU] Australia ............... PK0516

[51] Int. Cl.$^6$ ............ G01V 3/08; G01V 3/02
[52] U.S. Cl. ................... 324/334; 324/345; 324/359
[58] Field of Search ............ 324/334, 330, 331, 335, 324/345, 350, 359

[56] References Cited

U.S. PATENT DOCUMENTS

| | | | |
|---|---|---|---|
| 2,777,112 | 1/1957 | Coker et al. | 324/345 |
| 3,889,181 | 6/1975 | Greer | 340/943 |
| 4,021,725 | 5/1977 | Kirkland | 324/326 |
| 4,544,892 | 10/1985 | Kaufmann et al. | 324/334 |
| 4,675,606 | 6/1987 | Ganguly | 324/244 |
| 4,727,329 | 2/1988 | Behr | 324/345 |
| 4,814,711 | 3/1989 | Olsen et al. | 324/331 |
| 4,939,460 | 7/1990 | Patla et al. | 324/303 |
| 5,025,218 | 6/1991 | Ramstedt | 324/334 |
| 5,030,913 | 7/1991 | Byram | 324/345 X |
| 5,175,500 | 12/1992 | McNeill | 324/334 |

FOREIGN PATENT DOCUMENTS 267214 10/1964 Australia .

OTHER PUBLICATIONS

Stanley, John M., et al., "Magnetic Evidence of an Aboriginal Burial Ground" at Forster, N.S.W., *Memoirs of the Victorian Archaeological Survey*, ANZAAS, 1977, Sect. 25A, vol. 2, pp. 37–50, Coutts and Brooks, Eds.

Stanley, John M., "New Magnetometer Technology and its Application to Archaeological Exploration," *Archaeometry: an Australasian Perspective*, Austrl. Natl Univ., Canberra, 1982, pp. 151–155, Ambrose and Duerden, Eds.

*Primary Examiner*—Sandra L. O'Shea
*Assistant Examiner*—J. M. Patidar
*Attorney, Agent, or Firm*—Rothwell, Figg, Ernst & Kurz

[57] ABSTRACT

A method and a device for implementing the method, for geophysical surveying of an area (1) including continuous measurement of the earth's magnetic and electromagnetic field using a detector (6) held at a constant height (E) above the ground surface, in the order of one meter, while traversing in a criss-cross manner over the area (1) at speeds below a maximum speed (S), in the order of 10 km/h, and utilizing measured signal frequencies below a cutoff (F), being approximately the maximum speed (S) divided by twice the detector height (E), to indicate spatial variations in the measured field. Traversal distance can be measured on board the host vehicle and a real time output supplied. Simultaneously, using the same detector (6) and artificially induced magnetic fields generated by an inductive (2b and/or galvanic source (2a)), temporally varying fields having frequencies above the cutoff (F) can be measured and simply filtered out of the detector's (6) output for separate processing and storage. Temporally varying fields below the cutoff (F) can be detected by a synchronized stationary detector inputting to the processing equipment (10) so as to subtract such signals from the signals used to measure spatial field variations.

23 Claims, 3 Drawing Sheets

METHOD AND APPARATUS FOR SIMULTANEOUSLY COLLECTING SPATIALLY AND TEMPORALLY VARYING MAGNETIC SURVEY DATA

BACKGROUND OF THE INVENTION

This invention relates to methods and apparatus for geophysical exploration and other subterranean investigations. More particularly, it relates to an apparatus with which magnetic anomalies of temporal and spatial origin may be measured simultaneously and conveniently distinguished. The apparatus enables several electrical and magnetic parameters of the ground to be determined and mapped in the one operation and with the one sensing device. The speed with which this apparatus can obtain each measurement is such that it has now become practical to routinely record measurements at intervals of a meter or less and by so doing achieve exceedingly high definition in near surface geophysical investigation. Such information can be useful in geological mapping, and in the location of such things as mineral deposits, groundwater and petroleum and buried artificial items such as pipe-lines, explosive ordnance, archaeologically valuable material and the like.

Geophysical exploration methods involve the measurement of physical properties which vary in a manner which is related to changes in the composition and structure of the ground in the area of investigation. Such properties include, density, magnetic susceptibility and remanence, seismic velocity, electrical conductivity and polarizability and many more. Geophysical literature describes various apparatus for individually measuring these parameters. Two families of these physical properties are commonly measured in geophysical exploration methods. These are:

1. Magnetic Properties

The earth's magnetic field varies both in space and time. It is well established in the prior art to make use of this magnetic field in a number of ways for geophysical investigations. For example, magnetic detectors have been most commonly used to determine the magnitude of the earth's magnetic field at a number of points within a survey area. The spatial variation in the earth's magnetic field over the area surveyed can be isolated by subtracting from each measurement the value of the magnetic field measured simultaneously at a nearby, stationary reference point. The spatial variation in the magnetic field are quantitatively related to changes in the magnetic properties of the ground.

2. Electrical and Electromagnetic Properties

Electrical resistivity, electromagnetic and induced polarization mapping have been described in many articles to be found in geophysical literature. With each of these methods, an electric current is created in the ground from artificial galvanic or inductive sources, or by natural means. The flow of current will behave according to established electrical and electromagnetic rules. For example, it will preferentially flow through material that is of more conductive composition, and if the introduced current is of alternating polarity, then the current flow also obeys a frequency-depth relationship. It is also known that by creating an artificial current in the ground, a polarization effect may occur to a varying degree depending upon the composition of the material present and the frequency-depth relationship.

Various artificial energising current waveforms and frequencies may be used for different effects. Point by point measurement of the potential between electrodes placed in contact with the ground, and measurement of the secondary electro-magnetic field due to the current in the ground, and measurement of the phase between the transmitted waveform and the received signal have all been previously used, either individually or in combination, to map the subterranean electrical properties.

Galvanic measurements have of necessity been made point by point where electrodes were located in the ground. Consideration was required of the geometry of the electrode array. Limitations associated with the use of electrodes are avoided by applying inductive sources to generate the required currents in the ground. Individual components of the secondary electro-magnetic field arising from the flow of current in the ground are then commonly measured with induction coil type receivers. When inductive sources and receivers were employed, the method could be adapted to moving, marine or airborne applications. The use of inductive techniques required that consideration be given to the orientation of the transmitter and receiver.

SUMMARY OF THE INVENTION

In this invention, apparatus using a single transducer has been designed to measure several parameters, relating to magnetic, electrical or electromagnetic properties of the ground, simultaneously with inherent savings in cost, time and complexity.

The foregoing magnetic, electrical and electromagnetic properties may be simultaneously investigated by the apparatus described herein.

Broadly speaking, this invention can be described as a means or method for subterranean investigation wherein spatially varying magnetic or electromagnetic fields are determined by traversing a survey area with a magnetic detector at a predetermined approximately constant detector height at traversing speeds not exceeding a predetermined maximum speed and by measuring the magnetic or electromagnetic temporal signals comprising frequencies less than or equal to a high frequency cut off determined by the traversing speed and detector height.

In the present invention spatial magnetic anomalies are measured as a temporal signal by simply traversing a survey area. Positional information is obtained from an in-built odometer or alternative positioning device. It has been found that this temporal signal obtained from a moving magnetic sensor has a high frequency cut off which is related to the elevation of the sensor above ground and the speed at which it is moving.

Consider a magnetic detector that is operated at an approximately constant elevation E above the ground surface, and moved at a maximum speed S. The inventors have determined that the low pass cut off frequency F in the magnetic field of spatial origin will be given approximately by the relationship.

$$F = S/2E \qquad (1)$$

Thus, the temporal signal from a magnetic sensor traversing at 2 m/sec at an elevation of 1 m above ground, will have a 20 db cut off at less than or about 1 Hz.

Natural occurring temporal changes in the magnetic field below this frequency may conveniently be removed by reference to a synchronized, stationary magnetic sensor.

Thus, in one preferred form, the invention additionally includes steps of the method, or additional means, for simultaneously obtaining a measure of earth magnetic field temporal changes from a synchronised, stationary magnetic sensor, and subtracting same from the measured signals.

Artificially induced magnetic fields generated by an inductive or galvanic source, or a combination or both, may be simultaneously measured with a suitable magnetic sensor. The signal due to spatial sources in the ground may be conveniently filtered from that due to the artificial source provided that the artificial signal is restricted to frequencies greater than F, the highest frequency in the signal of spatial origin.

Low pass filtered data are resampled at regular distances determined by the positioning device and selected to properly sample the spatial magnetic field according to sampling theory. Commonly the interval will be approximately equal to the sensor elevation. The resampled data is recorded.

The high pass filtered data are spectrum analysed and relevant parameters of the spectrum also recorded at regular distance intervals. Relevant parameters commonly include the amplitude and phase at each of the component frequencies present in the artificially generated electromagnetic field.

The recorded spatial magnetic field and spectral parameters of the secondary electromagnetic field may be later analysed by the survey expert to produce the desired magnetic and electrical mapping of the survey area.

A suitable magnetic sensor must meet the required specifications of sensitivity and frequency response in order to detect magnetic field changes in the band from DC to the maximum frequency in the artificially induced signal.

A useful sensor for such measurements is an optically pumped device which will resonate at a frequency dependant upon the magnitude of the ambient magnetic field. Within limits, the operation of this type of sensor, is independent of orientation, thus avoiding a common restriction in the operation of previously used electromagnetic detectors.

By way of example only, one preferred form of the invention will now be described with reference to the accompanying drawings in which:

DESCRIPTION OF THE PREFERRED EMBODIMENTS

Figure 1:
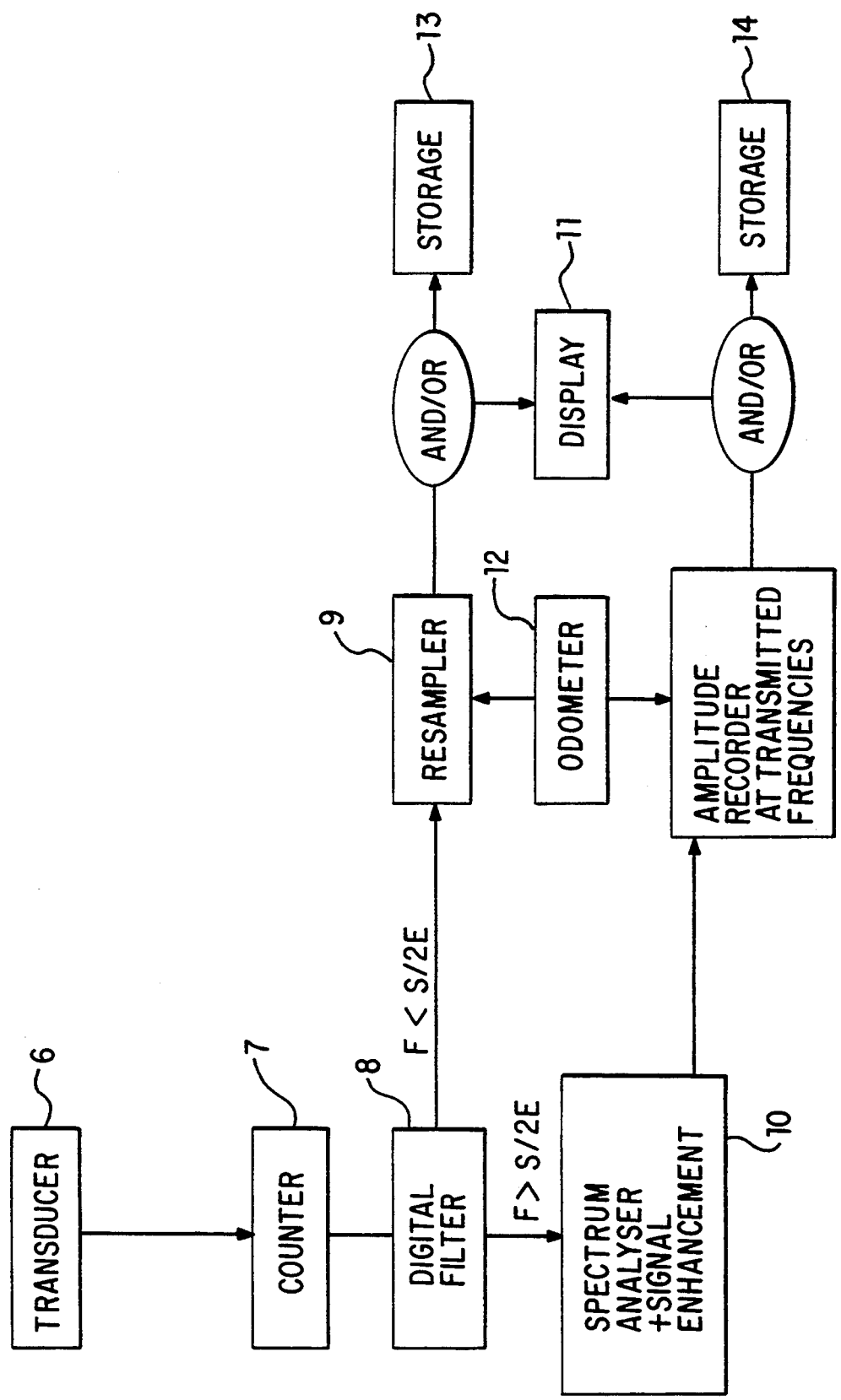
FIG. 1 is a flow chart indicating the mode of operation of an embodiment of the invention.
Figure 2:
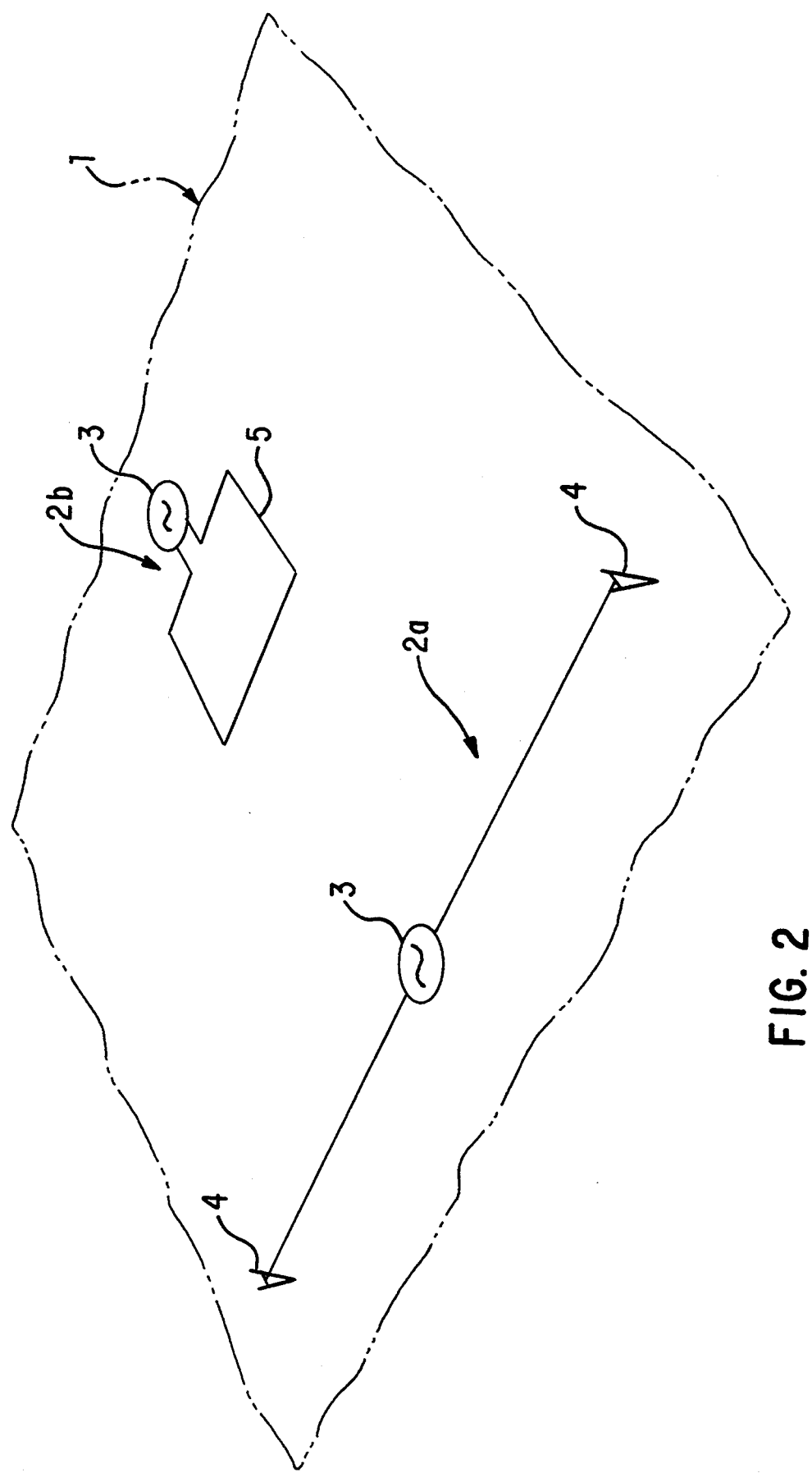
FIG. 2 is a plan sketch of a survey area in which a method of the invention may be affected.
Figure 3:
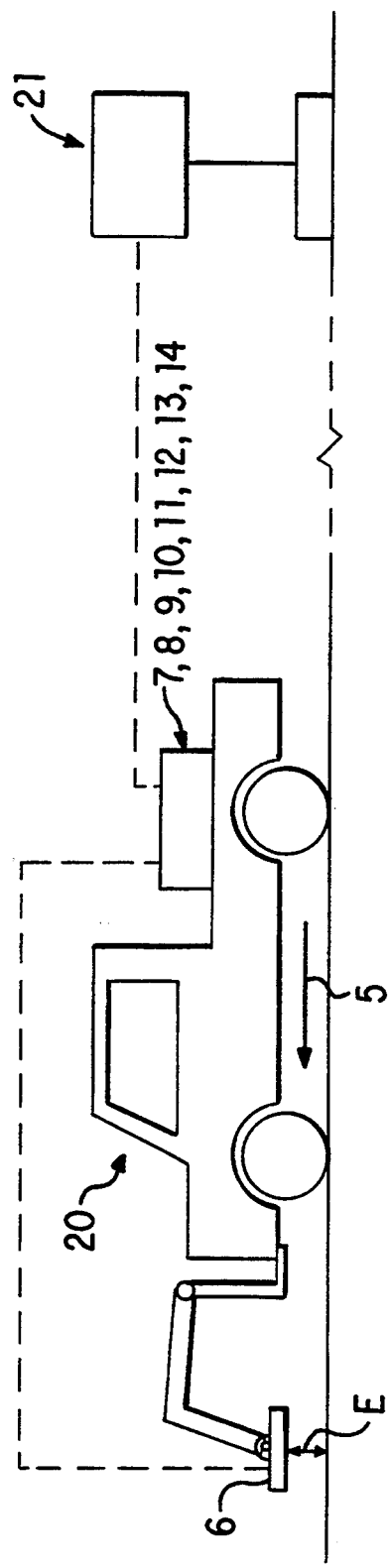
FIG. 3 is a side elevational view of an embodiment of the present invention.

An area to be surveyed 1, perhaps several square km is size, is firstly prepared by setting up an appropriate transmitter 2a or 2b. The transmitter 2a or 2b may comprise a direct, galvanic type transmitter 2a, having a power source and electric waveform generator 3 and electrodes 4, or an induction type transmitter 2b including an induction coil or antenna 5 and associated power source and waveform generator 3. In either case, the waveform transmitted must contain frequencies constrained to the range between F defined in equation 1 and the maximum frequency response of the digital magnetometer. A combination of both transmitter types operating at different waveform frequencies within the above defined band, may also be used to advantage in some situations. For convenience, preselected traverse lines forming a suitable network covering the survey area 1 are indicated to the personnel carrying out the survey work.

A magnetic field transducer 6, conveniently comprising of an optically pumped type magnetic resonance device, is transported by hand or by self propelled vehicle 20 at a substantially constant elevation E along the predetermined traverse lines. Meanwhile, an accurate odometer device 12, such as of cotton thread or radio type, accurately provides positional information of the transducer.

The signal from the transducer 6 is processed by a counter 7 and transformed into a digital signal representing the real time detected magnetic field intensity. Such signal is then filtered by a digital filter 8 into high frequency and low frequency components. The separation frequency F of the filter 8 will have already been selected according to equation 1 when the maximum traverse speed and sensor elevation combination were defined.

The low frequency components corresponding to spatial anomalies are resampled at 9 at regular position increments which should not exceed the elevation of the sensor above the ground. The time at which measurements are made is also recorded so that natural temporal variations in the earth's magnetic field as recorded from a synchronized stationary reference magnetometer 21 can be subtracted at a later stage.

The high frequency components corresponding to the secondary electromagnetic field associated with the current driven through the ground by the transmitter, is digitally processed at 10 including signal enhancement techniques and spectrum analysis. Again, at regular distance increments, the amplitudes of each of the transmitted frequencies is produced for storage 13, 14 (and later use) and immediate readout. When mapping certain sub soil properties it is desirable to obtain a measure of any phase shift between the original and detected signals. A radio timing link or similar synchronising device, can therefore be included and complex spectrum analysis used in processing the digital signal. The phase information at each of the transmitted signal frequencies is then recorded together with the amplitude information.

Also, for instantaneous benefit of the person conducting the measurements, a real-time visual display 11 can be provided in any predetermined desirable form such as graph or digital read-out.

Thus the information produced and optionally stored allows the survey expert to produce a magnetic field, electrical conductivity or other mapping of the survey area in the already well established manner. However, it is now possible to gather this varied information with a single transducer, at a very much greater rate, and therefore at a very much lower expense. Where it was previously often necessary to carry out a large number of individual measurements using different instruments, and record each of those measurements before moving on to the next measurement point, it is now possible to traverse the survey area quickly while continuously measuring, analysing and recording all of the necessary information with the one instrument.

While the speed of traversal is in part limited by the frequency response of the magnetic detector and the power of the digital processing equipment, available technology allows traverse speeds in the order of 10 km/h with a sensor elevation and a measurement interval of 1 m.

We claim:

1. A method for subterranean investigation wherein spatially varying magnetic and temporally varying electromagnetic fields being determined the method comprising the steps of:

traversing a survey area with a magnetic detector at a predetermined approximately constant detector height E at traversing speeds not exceeding a predetermined maximum speed S, thereby defining a cut off frequency F for signals representing said spatially varying magnetic field where $$F=S/2E;$$

using stationary field generating means to generate an artificially induced magnetic field in said survey area, the induced field having a frequency greater than said cut off frequency; and separating signals produced by the magnetic detector into two components, a first component comprising frequencies less than or equal to said cut off frequency and representing said spatially varying magnetic field, and a second component comprising frequencies greater than said cut off frequency resulting from the artificially induced temporally varying electromagnetic field.

2. The method of claim 1 wherein:
   E is approximately 1 meter; and
   S is approximately 2 meters per second.

3. The method of claim 1 additionally comprising the step of:

providing a stationary magnetic sensor measuring low frequency temporal changes in said fields, the stationary sensor having an output signal which is subtracted from the first signal component so as to significantly reduce or remove from the first signal component the effect of any low frequency temporal field changes that occur during the investigation.

4. The method of claim 1 wherein the first signal component is resampled at points corresponding to regular predetermined traversing distances which are approximately equal to, or less than, said detector height.

5. An apparatus for subterranean investigation comprising:

a vehicle for traversing a survey area at a controllable speed;

a mobile magnetic detector means on board the vehicle and held at a predetermined approximately constant detector height above ground level for producing a signal comprising a first signal component corresponding to spatially varying magnetic fields and a second signal component corresponding to temporally varying electromagnetic fields;

a stationary magnetic detector means arranged to produce a signal representing temporal magnetic and electromagnetic field changes; and signal processing means arranged to receive the signal from the stationary magnetic detector means and the mobile magnetic detector means, the processing means being further arranged to subtract the signal produced by the stationary detector means from the signal produced by the mobile detector means, and to then separate said first and second signal components produced by the mobile detector means and to record each of these components, the first and second signal components being separated by a cut off frequency determined by a predetermined maximum traversing speed and said detector height.

6. The apparatus of claim 5 wherein the vehicle is adapted to be operated up to a maximum traversing speed S, and the high frequency cut off is adapted to be set at a frequency F such that $$F=S/2E,$$

where E is the detector height.

7. The apparatus of claim 6; further including an on board device for measuring traversed distance, and for continually providing a traversed distance reference signal output to the signal processing means.

8. The apparatus of claim 6, further comprising on-board processing equipment for receiving the separated signals and said traversed distance signal and adapted to enhance, process and save the separated information in storage means in real time.

9. A method of processing survey data collected for subterranean investigation the survey data representing spatially varying magnetic and temporally varying electromagnetic fields which have been simultaneously recorded by traversing a survey area with a roving magnetic detector at a predetermined approximately constant detector height at traversing speeds not exceeding a predetermined maximum speed, thereby defining a cut off frequency for signals representing said spatially varying magnetic field, the processing method comprising the steps of:

providing supplementary data measured by a stationary magnetic sensor indicating temporal changes in said fields having frequencies below said cut off frequency;

subtracting the supplementary data from the signal representing the survey data so as to significantly reduce or remove from the signal representing the spatially varying magnetic field the effects of any temporal field changes that occur during the investigation;

separating a signal representing the survey data into two frequency components, a first component comprising frequencies less than or equal to a cut off frequency determined by the traversing speed and detector height and representing said spatially varying magnetic field and the second component comprising frequencies greater than said cut off frequency and representing the temporally varying electromagnetic field; and separately processing each of the frequency components to determine the subterranean characteristics of the survey area.

10. The method of claim 9, wherein the cut off frequency F is defined by $$F=S/2E;$$

where the cut off frequency is given by F, the predetermined maximum speed is given by S, and the approximately constant detector height is given by E.

11. The method of claim 10 wherein:

E is approximately 1 meter; and

S is approximately 2 meters per second.

12. The method of claim 10 wherein the first signal component is resampled at points representing regular predetermined traversing distances which are approximately equal to, or less than, said detector height.

13. An apparatus for subterranean investigation comprising:

a portable magnetic detector for outputting a signal comprising a first signal component having a frequency range primarily below a predetermined cut off frequency and a second signal component having a frequency range primarily above the predetermined cut off frequency; and signal processing means arranged to receive the signal from the portable magnetic detector, the processing means being arranged to separate said first and second signal components and to record each component, the selected cut off frequency F being determined by a predetermined maximum traversing speed S and operating height E of the portable detector, wherein $F = S/2E$, and the first signal component representing a spatially varying component of the earth's magnetic field and the second component resulting from a field artificially induced into a survey area and having a frequency greater than the cut off frequency.

14. The apparatus of claim 13 further including a traversed distance measuring means which continually provides a traversed distance reference signal output to the signal processing means.

15. The apparatus of claim 14 further comprising on-board processing equipment arranged to receive the separated first and second signal components and said traversed distance signal and to enhance, process and save the separated information in storage means in real time.

16. An apparatus for subterranean investigation comprising:

a vehicle for traversing a survey area at a controllable speed, a mobile magnetic detector means on board the vehicle and held at a predetermined approximately constant detector height above ground level for producing a signal comprising a first signal component corresponding to spatially varying magnetic fields and a second signal component corresponding to temporally varying electromagnetic fields; and signal processing means arranged to receive the signal from the mobile magnetic detector means, the processing means being further arranged to separate said first and second components and to record each component, the first signal component having an upper cut off frequency F determined by the vehicle speed S and detector height E where $F = S/2E$ and the second signal component resulting from a field artificially induced into the survey area and having a frequency greater than the cut off frequency F.

17. The apparatus of claim 16 further comprising a stationary magnetic detector means for measuring temporal magnetic and electromagnetic field changes, and processing devices for subtracting the signals measured by the stationary detector from the first signal component.

18. The apparatus of claim 16, further including an on board device for measuring traversed distance, and for continually providing a traversed distance reference signal output to the processing means.

19. The apparatus of claim 16, further comprising on-board processing equipment for receiving the separated signals and said traversed distance signal and adapted to enhance, process and save the separated information in storage means in real time.

20. A method of processing survey data collected for subterranean investigation the survey data representing spatially varying magnetic and temporally varying electromagnetic fields which have been simultaneously recorded by traversing a survey area with a roving magnetic detector at a predetermined approximately constant detector height E at traversing speeds not exceeding a predetermined maximum speed S thereby defining a cut off frequency F for signals representing said spatially varying magnetic field, where $F = S/2E$, and where a stationary field generator being used to generate an artificially induced temporally varying electromagnetic field in the survey area, the induced field having a frequency greater than the cut off frequency, the processing method comprising the steps of:

separating a signal representing the survey data into two frequency components, a first component comprising frequencies less than or equal to the cut off frequency and representing said spatially varying magnetic field and the second component comprising frequencies greater than said cut off frequency and resulting from the artificially induced temporally varying electromagnetic field; and separately processing each of the frequency components to determine the subterranean characteristics of the survey area.

21. The method of claim 20, wherein:

E is approximately 1 meter; and

S is approximately 2 meters per second.

22. The method of claim 20 comprising the additional steps of:

providing supplementary data measured by a stationary magnetic sensor, the supplementary data indicating temporal changes in said fields having frequencies below said cut off frequency; and subtracting the supplementary data from the signal representing the survey data, so as to significantly reduce or remove from the signal data representing the spatially varying magnetic field and the effects of any temporal field changes that occur during the investigation.

23. The method of claim 20 wherein the first signal component is resampled at points representing regular predetermined traversing distances which are approximately equal to, or less than, said detector height.

* * * * *